United States Patent
Kwak et al.

(10) Patent No.: US 8,295,787 B2
(45) Date of Patent: Oct. 23, 2012

(54) METHOD FOR TRANSMITTING AND RECEIVING ADDITIONAL CONTROL SIGNALS

(75) Inventors: Jin Sam Kwak, Anyang-si (KR); Seung Hee Han, Anyang-si (KR); Min Seok Noh, Anyang-si (KR); Yeong Hyeon Kwon, Anyang-si (KR); Hyun Woo Lee, Anyang-si (KR); Dong Cheol Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 272 days.

(21) Appl. No.: 12/450,105

(22) PCT Filed: Mar. 11, 2008

(86) PCT No.: PCT/KR2008/001369
§ 371 (c)(1),
(2), (4) Date: Jan. 21, 2010

(87) PCT Pub. No.: WO2008/111787
PCT Pub. Date: Sep. 18, 2008

(65) Prior Publication Data
US 2010/0136931 A1   Jun. 3, 2010

Related U.S. Application Data

(60) Provisional application No. 60/894,423, filed on Mar. 12, 2007.

(30) Foreign Application Priority Data

Apr. 27, 2007 (KR) .................. 10-2007-0041303

(51) Int. Cl.
*H04B 1/04* (2006.01)
(52) U.S. Cl. ....................................... 455/103; 455/126
(58) Field of Classification Search .......... 455/313–333, 455/126, 561; 332/103; 330/149
See application file for complete search history.

(56) References Cited

U.S. PATENT DOCUMENTS

| | | | | |
|---|---|---|---|---|
| 2,776,429 A | * | 1/1957 | Olerud | 455/333 |
| 4,283,795 A | * | 8/1981 | Steinberger | 455/313 |
| 4,312,032 A | * | 1/1982 | Kirby | 363/97 |
| 6,232,835 B1 | * | 5/2001 | Braithwaite | 330/149 |

(Continued)

FOREIGN PATENT DOCUMENTS

DE    696 34 925 T2    5/2006

(Continued)

*Primary Examiner* — Lana N Le
(74) *Attorney, Agent, or Firm* — McKenna Long & Aldridge LLP

(57) ABSTRACT

A method for transmitting/receiving an additional control signal without any loss of bandwidth and power in an original Tx signal is disclosed. If the additional control signal is transmitted via the Tx signal composed of at least one of data and control signals, at least one of the amplitude and phase of the Tx signal of the time- and frequency-resource domain is modulated according to the additional control signal to be transmitted. The modulated Tx signal is transmitted to the receiver, so that the additional control signal can be transmitted irrespective of the original Tx signal. According to a modulation status of at least one of an amplitude and a phase of the Rx signal contained in the time- and frequency-resource domain, the additional control signal can be acquired.

7 Claims, 9 Drawing Sheets

U.S. PATENT DOCUMENTS

| | | | |
|---|---|---|---|
| 6,271,724 B1 * | 8/2001 | Neffling | 330/149 |
| 6,587,513 B1 * | 7/2003 | Ichihara | 330/149 |
| 7,890,067 B2 * | 2/2011 | Lane et al. | 455/126 |
| 2002/0000890 A1 * | 1/2002 | Kojima et al. | 332/103 |
| 2004/0203553 A1 * | 10/2004 | Toyota et al. | 455/333 |
| 2004/0257981 A1 | 12/2004 | Ro et al. | |
| 2005/0113040 A1 | 5/2005 | Walker et al. | |
| 2006/0189353 A1 * | 8/2006 | Fujishima | 455/561 |
| 2007/0290749 A1 * | 12/2007 | Woo et al. | 330/149 |
| 2008/0024227 A1 * | 1/2008 | Toyota et al. | 330/149 |

FOREIGN PATENT DOCUMENTS

| | | |
|---|---|---|
| GB | 2283627 A * | 5/1995 |
| KR | 2004-0108491 | 12/2004 |
| WO | WO 2004/088899 A2 | 10/2004 |
| WO | WO 2006/029907 A1 | 3/2006 |

* cited by examiner

☐ Control Signal for UE #1
▨ Control Signal for UE #p
⦂ Control Signal for UE #q

METHOD FOR TRANSMITTING AND RECEIVING ADDITIONAL CONTROL SIGNALS

This application is a 371 national stage entry of International Application No. PCT/KR2008/001369, filed Mar. 11, 2008, and claims priority to U.S. Provisional Patent Application No. 60/894,423, filed Mar. 12, 2007 and Korean Patent Application No. 10-2007-0041303, filed Apr. 27, 2007, the contents of each of the above-identified applications is incorporated by reference herein in their entireties.

TECHNICAL FIELD

The present invention relates to a method for transmitting/receiving additional control signals without any loss of bandwidth and power in a communication system having limited radio resources.

BACKGROUND ART

Generally, a broadband communication system has limited radio resources. In order to maximize the efficiency of radio resources, a variety of methods for effectively transmitting/receiving signals in a time-, space-, or frequency-domain and their utilization methods have been developed.

Particularly, a multicarrier-based OFDM scheme reduces the complexity of a receiver under frequency selective fading environments of a broadband channel, uses different channel characteristics of subcarriers, and performs selective scheduling in a frequency domain, thereby increasing spectral efficiency. So, the multicarrier-based OFDM scheme has been recently focused to maximize the efficiency of radio resources in the frequency domain.

In order to maximize the efficiency in a space domain, a Multi-Input Multi-Output (MIMO) technology is required, and several time and frequency domains occur in the space domain, so that the multicarrier-based OFDM scheme transmits high-speed multimedia data.

In order to effectively use a time domain, the above-mentioned OFDM scheme performs channel encoding, performs scheduling based on channel selective characteristics of several users, and uses a HARQ scheme appropriate for transmission of packet data.

In order to implement a variety transmission/reception techniques for transmitting broadband Space-Time high-speed packets, transmission of downlink/uplink control signals for time-, space-, and frequency-domains is indispensable.

Under the above-mentioned environments, most conventional arts have been designed to use only radio resources of control channel pre-assigned for transmission of control signals, so that the amount of overhead of the control channels increases under broadband multi-user and multi-antennas environments, thereby reducing RF-channel capacity (e.g., a bandwidth) for actual data.

DISCLOSURE

Technical Problem

Accordingly, the present invention is directed to a method for transmitting and receiving additional control signals that substantially obviates one or more problems due to limitations and disadvantages of the related art.

An object of the present invention is to provide a method for generating additional control channels without any loss of bandwidth and power in a conventional transmission (Tx) signal during a transmission time of control signals, and transmitting control signals appropriate for different Quality of Service (QoS) requirements over an additional control channel.

Another object of the present invention is to provide a method for determining whether data is contained in a conventional Tx signal, and effectively transmitting/receiving additional control signals under different channel structures, so that it can be applied to the different channel structures in various ways according to the determined result.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for transmitting an additional control signal via a transmission (Tx) signal, the method comprising: modulating at least one of an amplitude and a phase of the Tx signal contained in a predetermined time- and frequency-resource domain according to the additional control signal; and transmitting the modulated Tx signal to a receiver, where the Tx signal comprises at least one of data and control signals, is provided.

Preferably, the predetermined time- and frequency-resource domain is determined to be a domain which includes one or more frequency resources and one or more time resources according to reliability required for the additional control signal.

Preferably, the amplitude and the phase of the Tx signal contained in the predetermined time- and frequency-resource domain are modulated according to the same additional control signal.

Preferably, at the modulating step, the Tx signal is modulated to have different amplitudes or different phases according to the additional control signal.

Preferably, if the Tx signal comprises data and control signals, a predetermined first channel structure is used for transmission of the Tx signal; and if the Tx signal comprises only the control signal, a predetermined second channel structure is used for transmission of the Tx signal. And, the predetermined time- and frequency-resource domain is determined according to the predetermined first and second channel structures.

In another aspect of the present invention, there is provided a method for receiving a reception (Rx) signal, including an additional control signal, the method comprising: acquiring the additional control signal according to a modulation status of at least one of an amplitude and a phase of the Rx signal contained in a predetermined time- and frequency-resource domain; compensating for the Rx signal using the acquired additional control signal; and acquiring transmission (Tx) signal information from the compensated Rx signal, when the Rx signal comprises at least one of data and control signals.

Preferably, the predetermined time- and frequency-resource domain is determined to be a domain which includes one or more frequency resources and one or more time resources according to reliability required for the additional control signal.

It is to be understood that both the foregoing general description and the following detailed description of the present invention are exemplary and explanatory and are intended to provide further explanation of the invention as claimed.

Advantageous Effects

The above-mentioned method for transmitting/receiving additional control signals according to the present invention generates additional control channels without any loss of frequency and power in a conventional Tx signal during a transmission time of control signals, transmits/receives additional control signals appropriate for different QoS requirements over an additional control channel, and increases system performance.

And, the present invention determines whether data is contained in the conventional Tx signal, and can be applied to different channel structures according to the determined result.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

The present invention relates to a method for generating a channel for additional control signals in association with Tx resources of time-, frequency-, and code-domains, and transmitting/receiving additional control signals over the generated channel. Amplitudes and phases for the additional control signals forming the additional control signal channels are represented by the following equation 1:

$$s_c = a_c \exp(j\theta_c) \quad \text{[Equation 1]}$$

Equation 1, $s_c$ is an additional control signal, $a_c$ is an amplitude of the additional control signal, and $\theta_c$ is a phase of the additional control signal.

In the meantime, the phase of the additional control signal can be determined by various modulation methods of the Tx signal. Provided that a M-ary PSK signal is transmitted, an available phase variation can be represented by the following equation 2:

$$\theta_c = \frac{\pi}{M}\left(\frac{2k+1}{M_c} - 1\right), \quad \text{[Equation 2]}$$
$$k = 0, 1, \ldots, M_c$$

In Equation 2, additional control signal information can be indicated by the variable $M_c$, and "M" in the equation 2 represents the modulation order of M-ary PSK.

Figure 1:
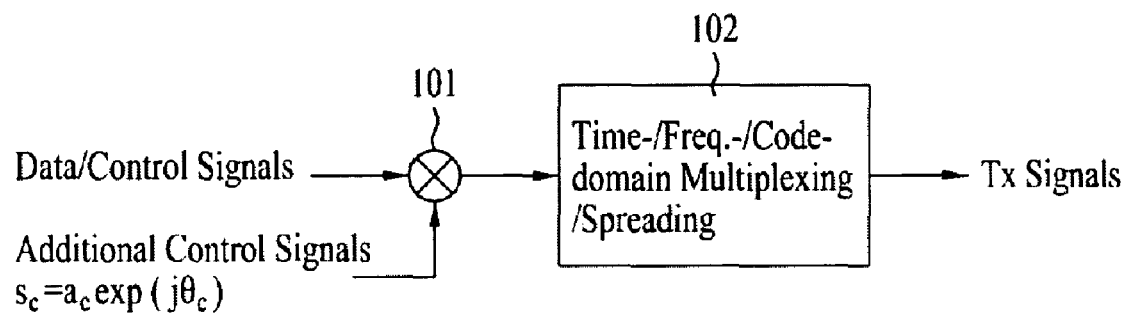
FIG. 1 is a block diagram illustrating a transmitter for transmitting modulated additional control signals along with Tx signals according to the present invention.

FIG. 1 is a block diagram illustrating a transmitter for transmitting modulated additional control signals along with the other signals to be transmitted according to the present invention.

In more detail, the modulated additional control signal having the amplitude and the phase of Equations 1 and 2 is multiplied by other transmission signals, in a multiplication module 101. In this case, the other transmission signals may be data, control signal, or both of them, as shown in FIG. 1. And, if the additional control signal is multiplied by the other transmission signals, this case indicates that the amplitude and phase of the transmission signals are modulated by the additional control signal.

In the meantime, the above-mentioned resultant signal created when the additional control signal is multiplied by the transmission may be properly mapped to radio resources of time-, frequency-, and code-domains by the time-/frequency-/code-domain multiplexing/spreading module 102, so that the mapping result may be then transmitted. In this case, an additional channel generation method is changed to another method according to a multi-user access method or Tx-signal multiplexing method based on FDM-, CDM-, and TDM-schemes. Detailed access methods of different additional channel generation methods will hereinafter be described. In the meantime, a method for receiving the above-mentioned Tx signal will hereinafter be described.

Figure 2:
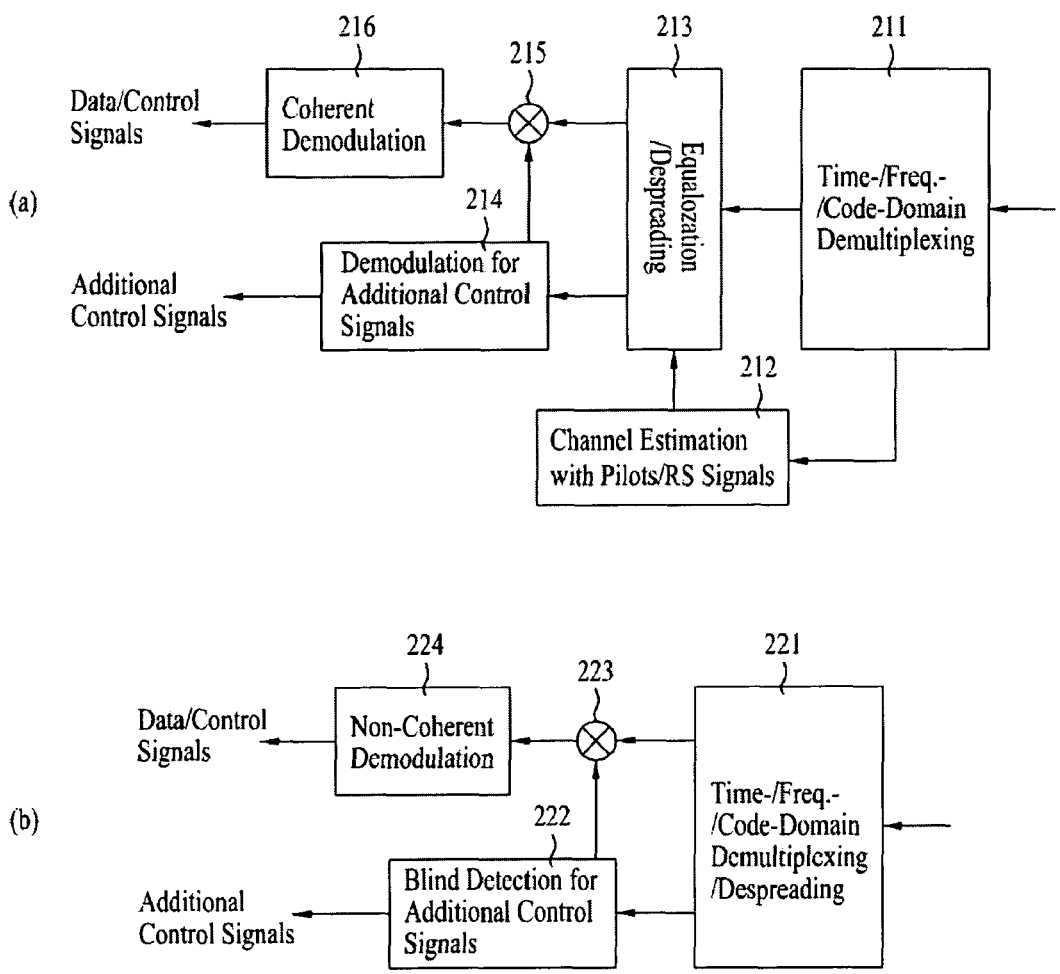
FIG. 2 is a block diagram illustrating a receiver based on additional control signals according to the present invention.

FIG. 2 is a block diagram illustrating a receiver based on additional control signals according to the present invention.

FIG. 2(a) shows a coherent-modulation-based receiver, which applies channel information to a control-channel resource unit via which an additional control channel is transmitted. FIG. 2(b) shows a non-coherent-based receiver, which demodulates desired data without using channel information.

Referring to FIG. 2(a), if reception (Rx) signals (e.g., data, control signal, or both of them) are coherent-demodulated, the demultiplexing/despreading module 211 of the receiver acquires the Rx signals from a time-, frequency-, or code-domain. A pilot or a reference signal (RS) from among the acquired Rx signals is used to perform channel estimation by the channel estimation module 212. The estimated channel value compensates for channel fading of Rx signals by the equalization/despreading module 213. The compensated Rx signals enter the additional control signal acquisition step by the additional control signal demodulation module 214. The multiplication module 215 removes the influence of additional control signals from Rx signals using the acquired additional control signals. The coherent-demodulation module 216 performs general coherent demodulation, so that it can acquire Rx signal information.

Referring to FIG. 2(b), if Rx signals (e.g., data, control signal, or both of them) are non-coherent-demodulated, the demultiplexing/despreading module 221 of the receiver acquires the Rx signals from the time-, frequency-, or code-domain. But, the non-coherent receiver of FIG. 2(b) does not perform the channel estimation differently from FIG. 2(a), the blind detection module 222 performs blind detection using samples of the demultiplexed/despread Rx signals, so that the additional control signals are recovered. Thereafter, the recovered additional control signal enters the multiplication module 223, so that the multiplication module 223 removes the influence of additional control signals from the Rx signals, and the resultant Rx signals are applied to the non-coherent demodulation module 224, so that the non-coherent demodulation module 224 performs general non-coherent demodulation, thereby acquiring Rx signal information.

In the meantime, the present invention modulates the transmission signal over the generated additional control channel, and transmits additional control signals. The present invention modulates at least one of amplitude and phase of each Tx signal in time- and frequency-domains, and multiplies the additional control signal having specific amplitude and phase by the Tx signal of the time- and frequency-domains. Preferably, the above-mentioned time- and frequency-domain may be determined to be a domain composed of at least one frequency resource and at least one time resource according to different QoS requirements of the Tx additional control signal.

The above-mentioned method for generating the additional control signal, mapping the generated additional control signal to a resource domain, and transmitting the mapping result will hereinafter be described.

Figure 3:
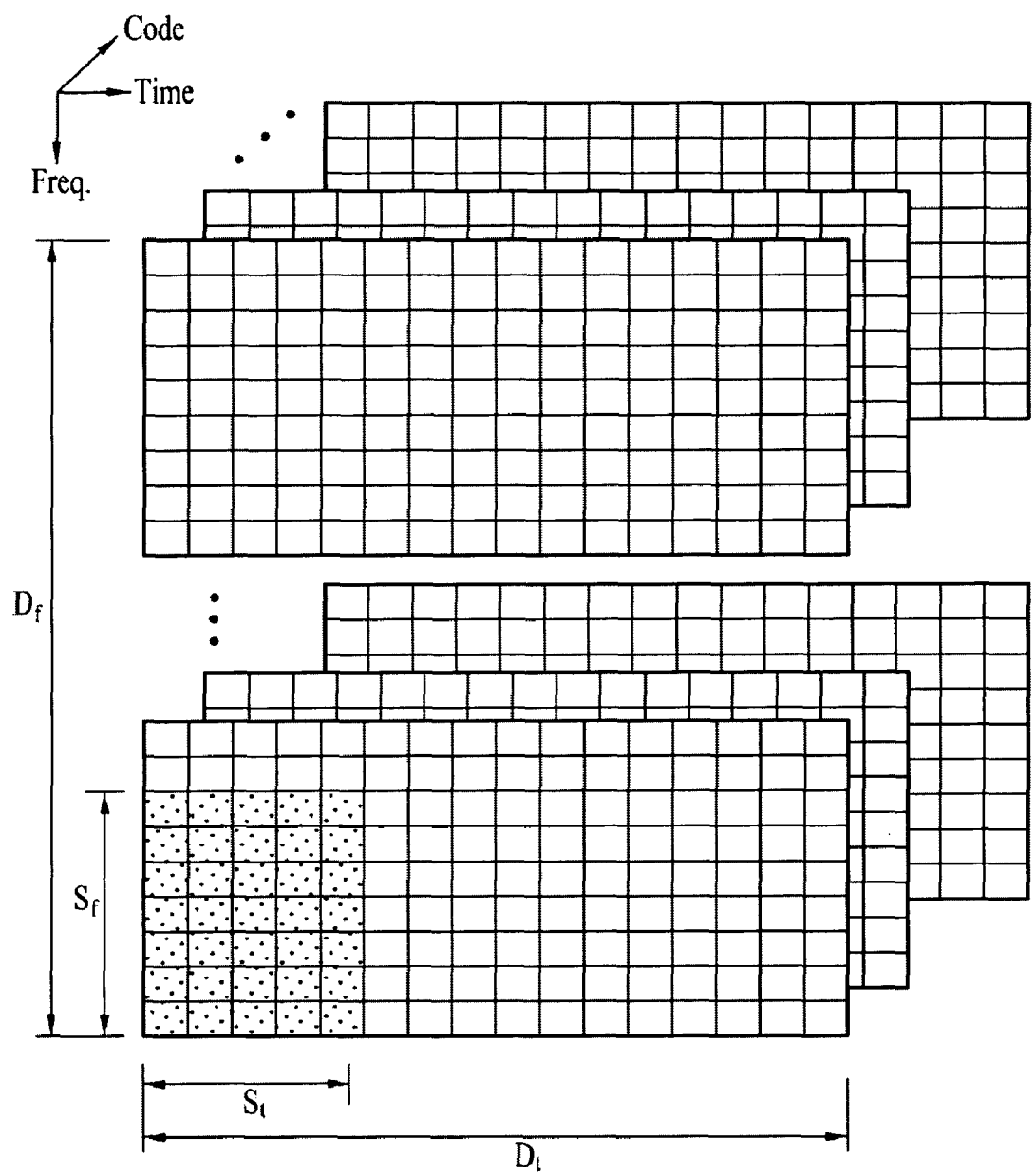
FIG. 3 shows additional control channels and resource structures of time-, frequency-, and code-domains for use in Tx signals according to the present invention.

FIG. 3 shows additional control channels and resource structures of time-, frequency-, and code-domains for use in Tx signals according to the present invention.

In order to explain the resource structure of FIG. 3, parameters (i.e., $D_f$, $D_t$, $S_f$, and $S_t$) of FIG. 3 can be defined as follows.

$D_f$ is the number of frequency-domain resources via which additional control channel information is transmitted, for example, the number of sub-carriers, the number of frequency channels, and the number of frequency groups.

$D_t$ is the number of time-domain resources via which additional control channel information is transmitted, for example, the number of Tx symbols, the number of slots, and the number of frames.

$S_f$ is a frequency-domain spreading factor for transmitting data/control signals.

$S_t$ is a time-domain spreading factor for transmitting data/control signals.

In this case, it is preferable that $D_f$ be set to an integer multiple of the frequency-domain spreading factor to which the same additional control signal is applied, as represented by $D_f = k_f * S_f$. It is preferable that $D_t$ be set to an integer multiple of the time-domain spreading factor to which the same additional control signal is applied, as represented by $D_t = k_t * S_t$.

The above-mentioned resource structure may include all Tx structures based on FDM-, CDM-, and TDM-schemes, and an arbitrary Tx-resource structure may generate additional control channels. The additional control signal can be applied to the above-mentioned FDM-, CDM-, and TDM-schemes in various ways. For example, there are four application cases 1)~4), and their detailed description will hereinafter be described.

1) FDM/TDM-based transmission structure (including a single-carrier structure): $S_f = S_t = 1$
2) Frequency-domain CDM: $S_f \neq 1$, $S_t = 1$
3) Time-domain CDM: $S_f = 1$, $S_t \neq 1$
4) Various combination structures of Cases 1)~3)

In more detail, the additional control signal modulated by Equation 1 converts an amplitude and/or a phase of a Tx signal (e.g., data and/or control signal), and is mapped to a resource domain having the same structure as FIG. 3, so that the mapping result is finally transmitted. If the amplitude and/or the phase of the Tx signal contained in the resource domain having the magnitude of $D_f$ and $D_t$ are/is modulated, the additional control signal may be represented by the modulated result.

In the meantime, the above-mentioned method for generating an additional channel by converting the phase and/or the amplitude of the Tx signal can be implemented in different ways according to the FDM or CDM scheme.

If the frequency- and time-domain spreading factor of the Tx signal is set to "1" according to the FDM scheme, the FDM scheme performs symbol-level modulation of the Tx signal used as the data/control signal in each frequency unit, so that the additional control signal can be represented by the modulated result. Otherwise, the CDM scheme may modulate several symbols of the time or frequency domain into other symbols according to the spreading factor of the Tx signal.

Therefore, the resource structure for allocating the additional control signal according to the embodiment shown in FIG. 3 can flexibly perform resource allocation to construct the additional channel, and is able to determine the amount of data capable of being transmitted over the additional control channel.

However, the demodulation method of the additional control channel is performed using individual samples on the basis of a domain composed of $D_f$ and $D_t$ in the additional control channel resource structure. As the number of samples increases, the reliability of the additional control channel also increases, so that a trade-off relationship between the Tx capacity and the number of samples of the additional channel unit is made. In the present invention, the term "sample" is a signal unit transmitted to a domain composed of both a single frequency resource and a single time resource.

In more detail, provided that $N_f$ is the number of all transmittable frequency-domain resources and $N_t$ is the number of time-domain resources contained in a symbol-unit transmission time interval (TTI), the number of bits transmittable over the additional control channel in a single TTI can be represented by the following equation 3:

$$R_{bit} = \left\lfloor \frac{N_f N_t}{D_f D_t} \right\rfloor \log_2 M_c \quad \text{[Equation 3]}$$
$$= \left\lfloor \frac{N_f N_t}{K_f K_t S_f S_t} \right\rfloor \log_2 M_c$$
$$= \left\lfloor \frac{N_f N_t}{N_s S_f S_t} \right\rfloor \log_2 M_c$$

In Equation 3, $N_s$ is the number of samples capable of being used to demodulate a control signal which has been transmitted over the additional control channel.

Based on the relationship between the number of bits transmittable over the additional control channel and the number of unit samples used to demodulate a signal including additional control signals, a method for determining the resource domain to transmit the additional control signal will hereinafter be described in detail.

Figure 4:
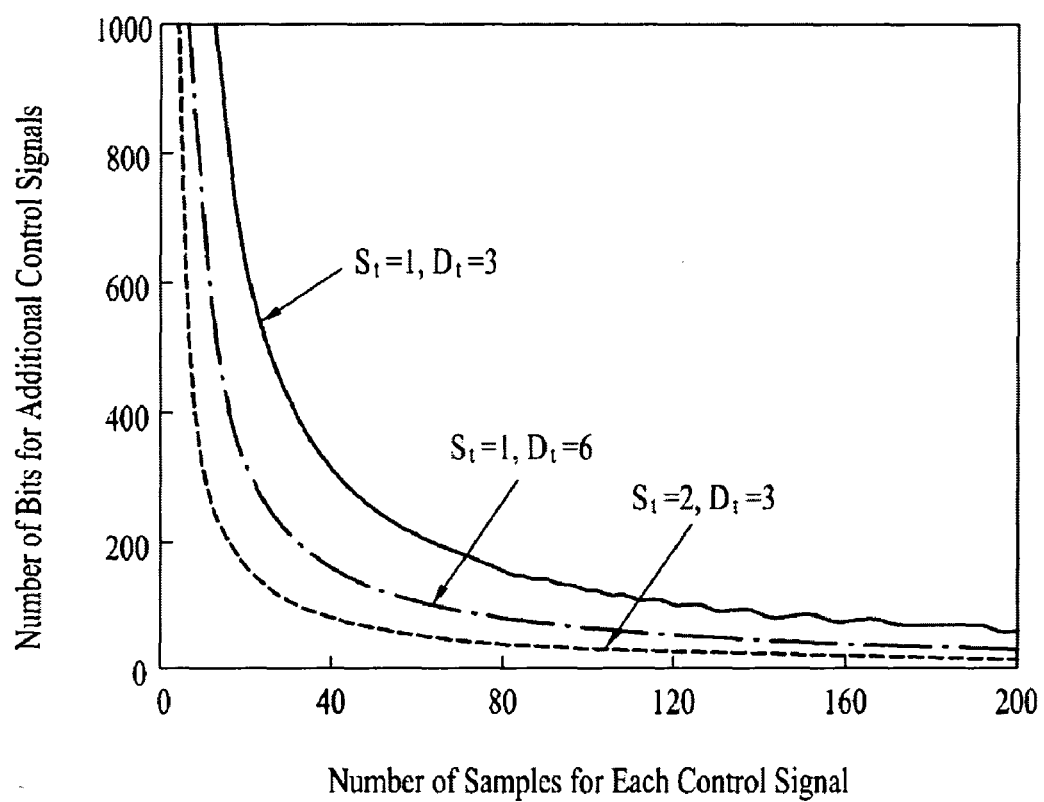
FIG. 4 is a graph illustrating the relationship between the number of bits capable of being transmitted over an additional control channel and the number of unit samples used for demodulating a signal equipped with additional control signals according to the present invention.

FIG. 4 is a graph illustrating the relationship between the number of bits capable of being transmitted over an additional control channel and the number of unit samples used for demodulating a signal equipped with additional control signals according to the present invention.

In more detail, it is assumed that a signal is QPSK-modulated under the OFDM environment and the QPSK-modulated result is then transmitted, so that the relationship between the number of bits of a control signal transmittable over the additional control channel and the number of samples used to demodulate the control signal is depicted in FIG. 4. Specifically, the result of FIG. 4 is acquired under the OFDM environment in which the number ($N_f$) of all frequency resources is 2048, the number ($N_t$) of all time resources is 12, and the frequency-domain spreading factor ($S_f$) of the Tx signal is 16.

As can be seen from FIG. 4, the channel construction can be flexibly made according to the number of bits required for transmitting the additional control signal, and the number of samples may also be changed to another number according to requirements of the control signal. Therefore, the method for transmitting the additional control channel signal according to the present invention can determine domains (i.e., the number of samples to which the same additional control signal is applied) for modulating the amplitude/phase of the Tx signal according to unique reliabilities required for individual QoS control signals. As a result, the present invention can flexibly design a channel according to unique Tx capacity and unique Tx reliability for each control signal.

In the meantime, the above-mentioned method for modulating the Tx signal, mapping the modulated result to the time-, frequency-, and code-domain resources, and detecting a desired signal upon receiving the mapping result will hereinafter be described in detail.

In order to recover the Tx signal which has transmitted over the additional control channel, the present invention requires the coherent or non-coherent access method according to the demodulation method of the amplitude- and/or phase-modulated signal of the above-mentioned additional control signal The coherent-demodulation-based receiver shown in FIG. 2(a) can acquire channel information from the time- or frequency-domain via a pilot or RS (reference signal), and reduce the time/frequency selective fading effect of the Rx signal, thereby increasing the reliability of samples used for demodulating the additional control signal. Therefore, if the additional control channel is generated and applied to a resource structure at which the data signal arrives. Generally, the receiver of FIG. 2(a) can perform channel estimation using the pilot or RS, so that it is preferable that the additional control signal be recovered by the coherent demodulation scheme.

The non-coherent-demodulation-based receiver shown in FIG. 2(b) has difficulty in compensating for the time/frequency selective fading in the Rx signal by acquiring channel information. The additional control signal must be recovered using samples acquired by demultiplexing or despreading the Rx signal. However, as shown in FIG. 3, the present invention applies the same additional control signal to a Tx signal contained in a predetermined time- and frequency-domain, and transmits the applied result, so that the above-mentioned time-/frequency-selective fading effect can be reduced. In other words, the present invention can establish the variable $D_f$ within a coherent bandwidth in consideration of a delay spread encountered by multi-path characteristics of a RF channel. And, the present invention can establish the variable $D_t$ within a coherent time in consideration of Doppler characteristics caused by user's mobility. As a result, the present invention can perform blind detection using $N_s$ samples contained in the time- and frequency-domains. In this case, $N_s$ is the number of samples contained in $D_f * D_t$, and may be set to "1" according to the reliability required for the control signal. Specifically, if the additional control signal is transmitted via the control signal composed of spreading codes (e.g., SCH), the present invention can detect the additional control signal from a single sample using the despreading, so that it can determine an appropriate receiver structure according to the type of original Tx data.

According to the above-mentioned method for detecting the coherent or non-coherent additional control signal, a variety of methods for detecting a phase and its amplitude variation on the basis of several samples generated from either original Tx data or control signals are required. For example, Mc number of candidate constellation points are generated using a Geometric clustering algorithm (e.g., a K-means (or medoids) algorithm or, QT-clustering algorithm), and are compared with other constellation points capable of being actually transmitted, so that the phase variation can be estimated according to the comparison result. As a result, the additional control channel signal from the Rx signal can be demodulated according to the above-mentioned method.

If there is a different demodulation technique in the original Tx signal corresponding to samples contained in the frequency- and time-domains to which the same additional control channel of FIG. 3 is applied, a phase of the additional control signal is determined as described above. After a demodulator performs the above-mentioned recovery method associated with the same modulation method, it calculates the sum of weighted values of the distances between each candidate constellation point and each transmittable constellation point, so that the additional control channel signal can be determined according to the comparison result of the weighted values. In this case, the weighting factor may be determined by the number of samples contained in a specific area to which the same modulation scheme is applied.

The above-mentioned algorithm for detecting the additional control signal will hereinafter be described in detail.

According to the present invention, the receiver, which has received the Tx signal having the amplitude and/or phase modulated by the additional control signal, estimates the amplitude and/or the phase of the Rx signal, so that the present invention provides a method for recovering the additional control signal using the above-mentioned receiver. In other words, the present invention performs constellation demapping to acquire the additional control signal from the Rx signal, and removes the influence of the acquired additional control signal from the Rx signal, thereby acquiring information of the original Tx signal from the resultant Rx signal.

Figure 5:
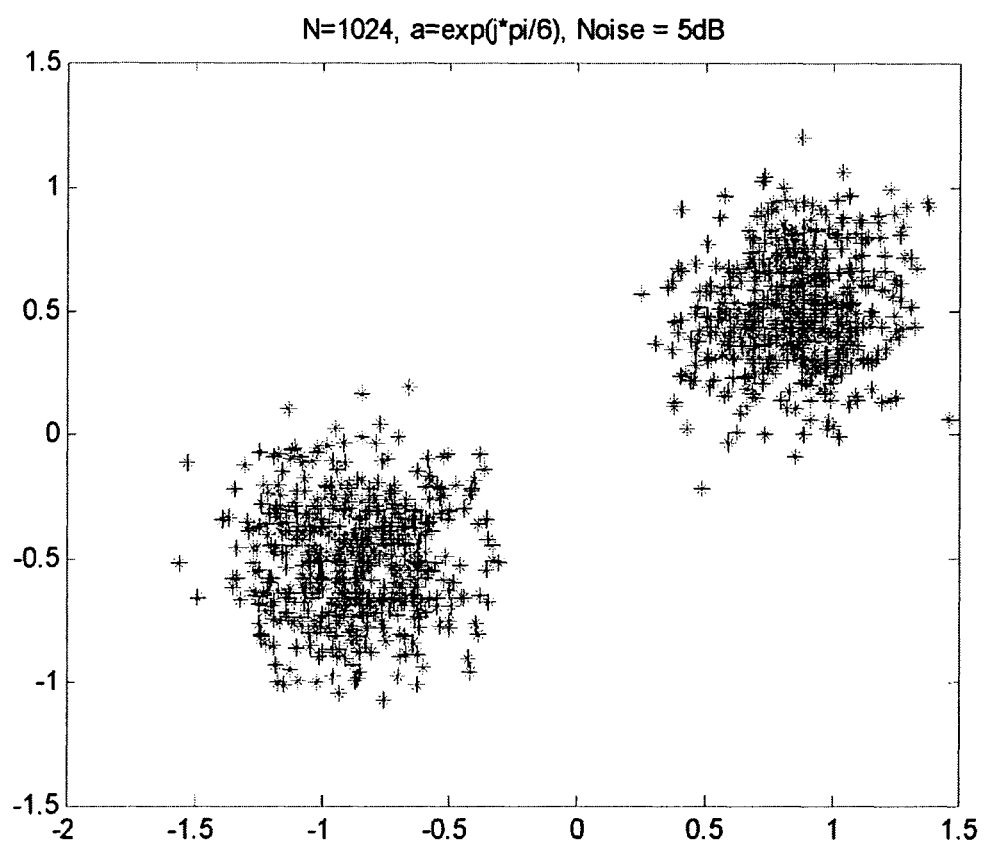
FIG. 5 shows a constellation created when a Tx signal is BPSK-modulated and the modulated Tx signal is then modulated by additional control signals according to the present invention.

FIG. 5 shows a constellation created when a Tx signal is BPSK-modulated and the modulated Tx signal is then modulated by additional control signals according to the present invention.

In more detail, the constellation of FIG. 5 is made when the amplitude of the additional control signal represented by Equation 1 is set to "1" and its phase is 30°. Namely, if there is no variation in the amplitude of the Tx signal and only the phase rotates by 30°, the constellation of FIG. 5 is made.

As described above, the transmitter according to the present invention does not transmit information of the amplitude ($a_c$) and information of the phase ($\theta_c$) shown in Equation 1 to the receiver. As can be seen from FIG. 5, the receiver receives a signal different from the known BPSK constellation, so that the receiver must estimate amplitude/phase variation information caused by the additional control signal without assistance of the transmitter. There is no variation in the amplitude (i.e., $a_c=1$) in FIG. 5, but there is a variation in the phase, so that the constellation of FIG. 5 is rotated as compared to the conventional BPSK constellation, so that the rotation degree must be estimated.

However, in order to estimate the above-mentioned rotation degree, the accurate value of each Rx signal must be recognized. Therefore, in order to acquire the above-mentioned variation amount, the following technique can be used.

The present invention does not know category information of each Rx signal, such that it groups individual signals by referring to a grouping format of constellation coordinates on a constellation map, and maps each group to a constellation of original signals. As a result, the present invention can acquire the amplitude and phase information added by the additional control signal. In other words, according to the present invention, the additional control signal can be commonly applied to the Tx signal contained in the frequency- and time-domain ($D_f * D_t$), so that a common constellation and variation information caused by the additional control signal applied to the common constellation can be estimated using samples contained in the frequency- and time-domain ($D_f * D_t$).

In the meantime, the constellation coordinates caused by the Tx modulation based on the additional control signal according to the present invention may be contained in a predetermined range in which constellation coordinates of the original Tx signal can be discriminated.

Figure 6:
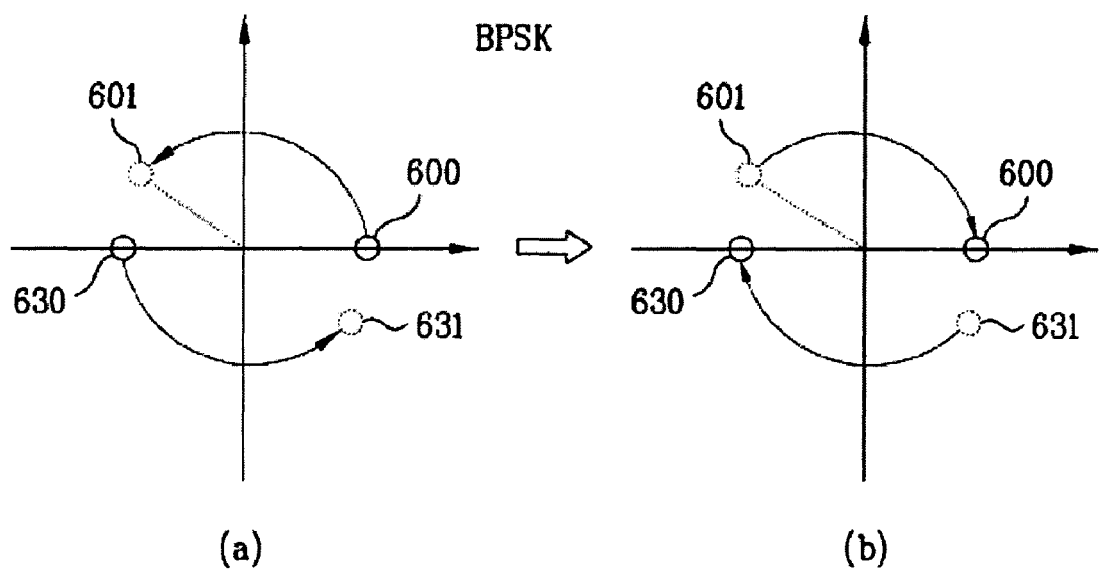
FIG. 6 shows a phase range which is changeable by additional control signals when a method for modulating an original Tx signal is a BPSK.

FIG. 6 shows a phase range which is changeable by additional control signals when a method for modulating an original Tx signal is a BPSK.

In FIG. 6, "600" and "630" are constellation coordinates to which the original Tx signal is mapped according to the BPSK modulation scheme. And, "601" and "631" are constellation coordinates formed when the constellation coordinates of the original Tx signal are rotated by the additional control signal.

In FIG. 6(a), the constellation coordinates of the original Tx signal are rotated by the additional control signal. In FIG. 6(b), if the influence of the additional control signal is removed from the receiver, the constellation coordinates of the Rx signal rotated by the additional control signal is restored to the constellation coordinates of the original Tx signal.

In this way, if the original Tx signal is BPSK-modulated, the phase rotation caused by the additional control signal may be determined in a predetermined range in which the original Tx signal can be discriminated, i.e., the range from −90° to 90°.

Figure 7:
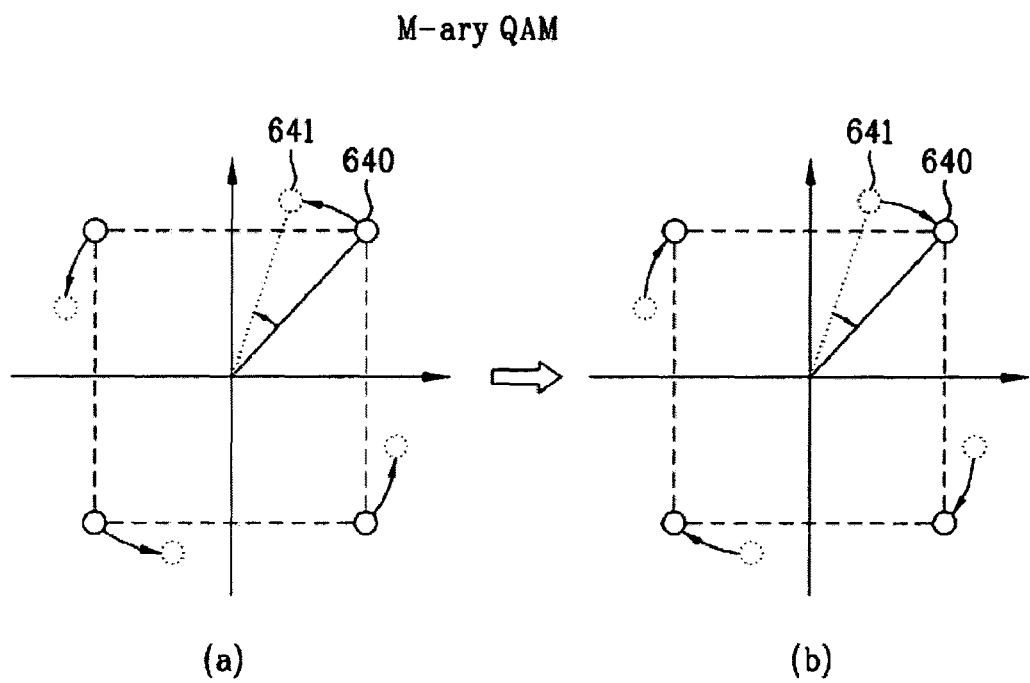
FIG. 7 shows a phase range which is changeable by additional control signals when an original Tx signal is modulated by a M-ary QAM according to the present invention.

FIG. 7 shows a phase range which is changeable by additional control signals when an original Tx signal is modulated by a M-ary QAM according to the present invention.

In FIG. 7, "640" is one of constellation coordinates created when the Tx signal is modulated by the M-ary QAM scheme, and "641" is a specific format on which the coordinates of 640 are phase-rotated by the additional control signal. In the same manner as in FIG. 6, FIG. 7(a) shows that the constellation coordinates of the original Tx signal are phase-rotated by the additional control signal, and FIG. 7(b) shows that the constellation coordinates of the Rx signal phase-rotated by the additional control signal is restored to the constellation coordinates of the original Tx signal when the influence of the additional control signal is removed from the phase-rotated Tx signal.

In this way, if the original Tx signal is modulated by the M-ary QAM scheme, the phase rotation caused by the additional control signal can be determined in a predetermined range in which the original Tx signal can be discriminated, i.e., the range from −180/M° to 180/M°.

The present invention effectively transmits the additional control signals without any loss of bandwidth and power in the original Tx signal composed of data and/or control signals, establishes variable frequency- and time-domains according to the reliability required for individual control signals, and modulates the Tx signal contained in a corresponding domain according to the additional signal, so that the method for transmitting the additional control signal can be appropriately applied. As shown in FIG. 3, the present invention can design the additional control signals to have a variety of resource structures, so that it can be applied to a variety of channel structures according to the original Tx signal.

The method for transmitting/receiving the additional control signal according to the present invention may be applied to the 3GPP LTE uplink channels in various ways, and associated embodiments will hereinafter be described in detail.

In accordance with one embodiment of the present invention, the SC-FDM scheme can effectively transmit the concentrated Tx power over the 3GPP LTE uplink, and can reduce the PAPR of the power variation of the OFDM signal. Under this configuration, the control signal can be transmitted in two methods, i.e., a first method 1) and a second method 2). According to the first method 1), the signal are simultaneously transmitted. According to the second method 2), only the control signal is transmitted. The method for applying the above-mentioned additional control signal transmission method to the first and second methods can be implemented in different ways.

Figure 8:
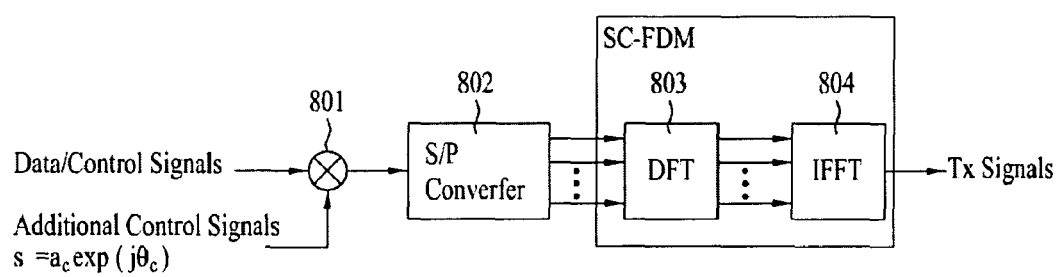
FIG. 8 is a block diagram illustrating a method for transmitting additional control signals when data and control signals are simultaneously transmitted according to the present invention.

FIG. 8 is a block diagram illustrating a method for transmitting additional control signals when data and control signals are simultaneously transmitted according to the present invention.

Referring to FIG. 8, if the data and the control signals are simultaneously transmitted as Tx signals, the phase and/or the phase of the Tx signal are/is changed by the additional control signal denoted by Equation 1, and the changed result can be transmitted according to the SC-FDM scheme. In more detail, the multiplication module 801 may modulate the amplitude and/or phase of the Tx signal including the data and control signals according to the additional control signal. The amplitude-modulated and/or phase-modulated Tx signals are converted into parallel signals by the serial/parallel (S/P) converter 802. Then, the SC-FDM is performed by the DFT module 803 and the IFFT module 804, so that the SC-FDM result may be transmitted via the uplink.

In this case, all or some of control signals to be transmitted may also be transmitted as the additional control signals.

As described above, in the above-mentioned embodiment for transmitting the additional control signals along with the data and control signals, provided that the original Tx signal may be composed of the FDM ($S_f=S_t=1$), and the additional control channel is transmitted to the 20 MHz bandwidth via a single resource block (RB) ($D_f=12$) during a TTI of 1 msec ($D_t=14$), the additional control signal composed of $k_{RB}$*log ($M_c$) bits can be transmitted via the $k_{RB}$ number of resource blocks (RBs). In other words, the present invention can detect a single additional control signal using 144 samples (i.e., 12*(14−2); except for two RSs) contained in the aforementioned frequency- and time-domains.

In this way, if the additional control signal is demodulated by a sufficient number, of samples, the reliability of the Tx signal can be greatly increased. Therefore, the present invention is advantageous to transmission of the control signal (e.g., ACK/NACK) which requires a lower error rate as compared to a CQI (Channel Quality Indicator) or PMI.

In the meantime, if the additional control signal transmission method is applied to the channel structure created when only the control signal other than data is transmitted as the original Tx signal, a detailed description will hereinafter be described.

Figure 9:
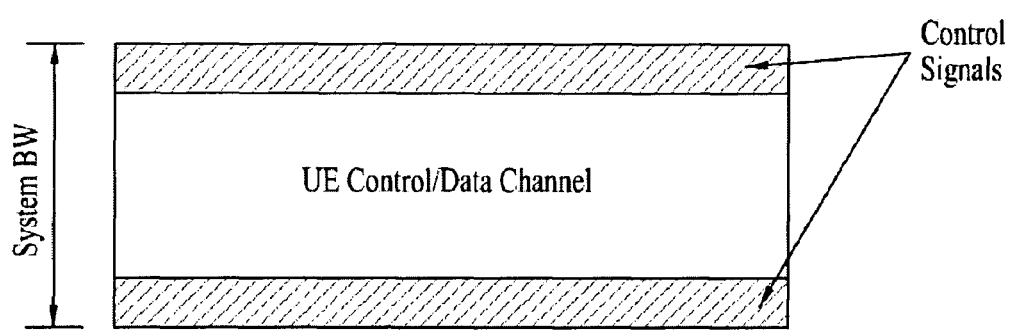
FIG. 9 shows a channel structure used when only uplink control signals are transmitted according to the present invention.

FIG. 9 shows a channel structure used when only uplink control signals are transmitted according to the present invention.

Referring to FIG. 9, if only the 3GPP LTE uplink transmits only the control signal, the user equipment (UE) may receive one or both ends of the system bandwidth to transmite the control signal. Therefore, a corresponding UE forms the control signal to be transmitted within the allocated bandwidth according to the SC-FDM scheme, and transmits the formed control signal. In order to transmit the additional control signal to the channel, the present invention can perform the FDM- or CDM-formatted access.

Figure 10:
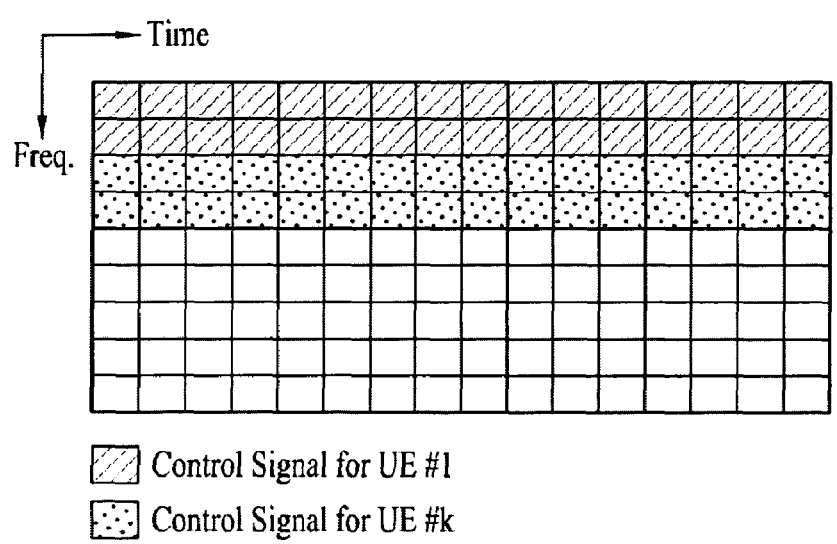
FIGS. 10~11 show a method for transmitting additional control signals according to a FDM or CDM scheme when only uplink control signals are transmitted according to the present invention.
Figure 11:
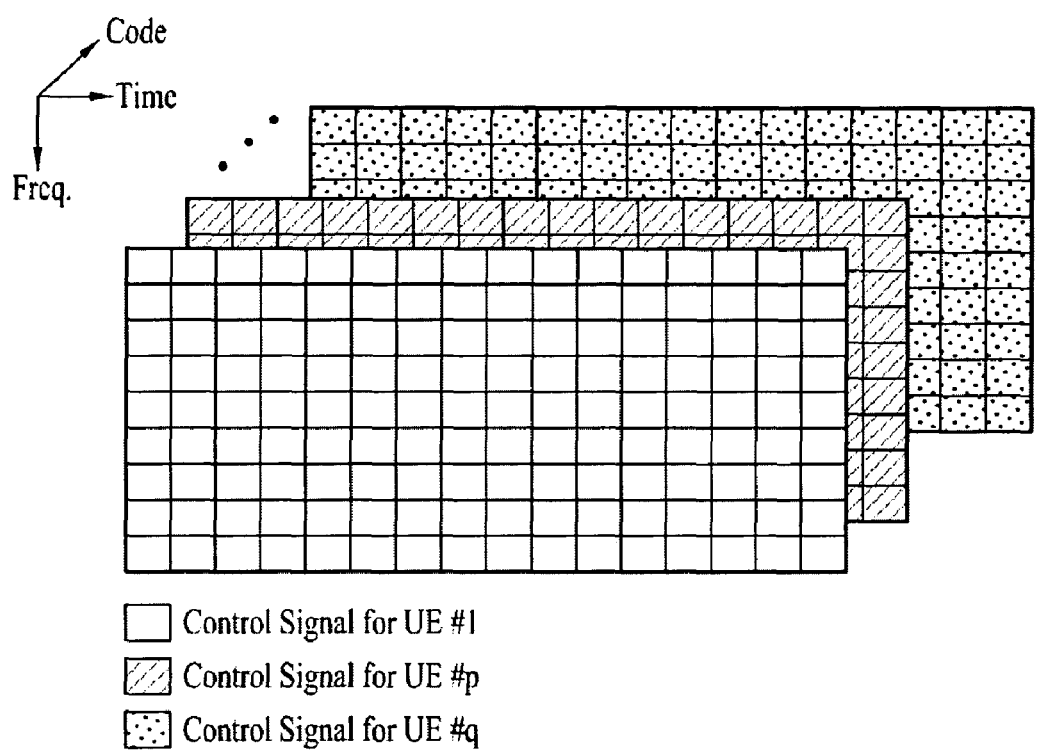

FIGS. 10~11 show a method for transmitting additional control signals according to a FDM or CDM scheme when only uplink control signals are transmitted according to the present invention.

As shown in FIG. 10, if the additional control signal is transmitted according to the FDM scheme, two successive sub-channels are used as a basic unit for transmitting the additional control signal, and a single additional control signal is transmitted according to the basic unit for transmitting the additional control signal. If necessary, the above-mentioned FDM scheme assigns several control channels, so that a single additional control signal can be transmitted.

In more detail, provided that the original Tx control signal is transmitted via 6 control channels within a single RB as shown in FIG. 10, and a basic unit for the additional control channel application is a single RB (i.e., 1RB; $D_f=12$) and a single TTI (i.e., 1TTI; 14 symbols; $D_t=14$), the additional control signal of log($M_c$) bits can be transmitted via the 1RB, and a single additional control symbol can be detected via 96 samples (12*(14−6); except for 6 RS symbols).

In this way, if the time-domain spreading code is applied to the FDM format, the number of samples for recovering the additional channel signal is reduced, but the reliability increases by a time-domain average value of each sample, so that the additional channel signal can be recovered.

In the meantime, if the additional control signal is transmitted according to the CDM scheme, the additional control signal is transmitted as shown in FIG. 11. In more detail, the spreading code (e.g., a Zadoff-Chu (ZC) sequence) characteristics are applied to the pre-allocated control channel of the frequency domain. In the same manner as in the FDM scheme, the same additional control signal is transmitted to the basic resource unit for transmitting the additional control channel, so that the control signal can be transmitted to a destination without using an additional bandwidth and power request.

The method for generating the additional control channel and transmitting the additional control signal using the generated additional control channel can be flexibly applied to a Multi-Input Multi-Output (MIMO) environment requiring transmission of several ACK/NACK signals, thereby reducing an amount of overhead in each control signal.

If there is no Tx control signal for the additional control channel, the data signal can be transmitted, and the frequency efficiency increases, thereby increasing the amount of Tx data.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, according to the above-mentioned method for transmitting/receiving additional control signals, the present invention generates additional control channels without any loss of frequency and power in a conventional Tx signal during a transmission time of control signals, transmits/receives additional control signals appropriate for different QoS requirements over an additional control channel, and increases system performance. The scope or spirit of the present invention is not limited to only the system disclosed in the above-mentioned description, and can also be applied to a variety of wireless communication systems.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for transmitting additional control information via a transmission (Tx) signal, the method comprising:

modulating the additional control information to produce the modulated additional control signal having an amplitude and a phase according to the additional control information;

multiplying the modulated additional control signal by the Tx signal such that at least one of an amplitude and a phase of the Tx signal is determined according to the additional control information; and transmitting the modulated additional control signal multiplied by the Tx signal via a predetermined time- and frequency-resource domain to a receiver, wherein the Tx signal comprises at least one of data and control signals, wherein, at said multiplying, the amplitude and the phase of the Tx signal transmitted via the predetermined time- and frequency-resource domain are determined according to the same additional control signal.

2. The method according to claim 1, wherein the predetermined time- and frequency-resource domain is determined to be a domain which includes one or more frequency resources and one or more time resources according to reliability required for the additional control signal.

3. The method according to claim 1, wherein:

at said multiplying, the Tx signal is modulated to have different amplitudes or different phases according to the additional control information.

4. The method according to claim 1, wherein:

if the Tx signal comprises data and control signals, a predetermined first channel structure is used for transmission of the Tx signal, and if the Tx signal comprises only the control signal, a predetermined second channel structure is used for transmission of the Tx signal, and the predetermined time- and frequency-resource domain is determined according to the predetermined first and second channel structures.

5. An apparatus for transmitting additional control information via a transmission (Tx) signal, the apparatus comprising:

a modulator configured for modulating the additional control information to produce the modulated additional control signal having an amplitude and a phase according to the additional control information;

a multiplier configured for multiplying the modulated additional control signal by the Tx signal such that at least one of an amplitude and a phase of the Tx signal is determined according to the additional control information; and a transmitter configured for transmitting the modulated additional control signal multiplied by the Tx signal via a predetermined time- and frequency-resource domain to a receiver, wherein the Tx signal comprises at least one of data and control signals, wherein, at said multiplying, the amplitude and the phase of the Tx signal transmitted via the predetermined time- and frequency-resource domain are determined according to the same additional control signal.

6. The apparatus according to claim 5, wherein by said multiplying of the transmitter the Tx signal is modulated to have different amplitudes or different phases according to the additional control information.

7. The apparatus according to claim 5, wherein:

if the Tx signal comprises data and control signals, a predetermined first channel structure is used for transmission of the Tx signal, and if the Tx signal comprises only the control signal, a predetermined second channel structure is used for transmission of the Tx signal, and the predetermined time- and frequency-resource domain is determined according to the predetermined first and second channel structures.

\* \* \* \* \*